March 2, 1948.  J. A. MULLER ET AL  2,437,115
MECHANICALLY ACTUATED HYDRAULIC CONTROL SYSTEM FOR PUMP CONTROL
Filed Nov. 11, 1943  2 Sheets-Sheet 1

INVENTORS
JOHAN A. MULLER,
WARREN R. TUCKER,
BY
Toulmin & Toulmin
ATTORNEYS

INVENTORS
JOHAN A. MULLER,
WARREN R. TUCKER,
BY
Toulmin & Toulmin
ATTORNEYS

Patented Mar. 2, 1948

2,437,115

UNITED STATES PATENT OFFICE 2,437,115

MECHANICALLY ACTUATED HYDRAULIC CONTROL SYSTEM FOR PUMP CONTROL

Johan A. Muller and Warren R. Tucker, Dayton, Ohio, assignors to H-P-M Development Corporation, Wilmington, Del., a corporation of Delaware Application November 11, 1943, Serial No. 509,853

7 Claims. (Cl. 60—52)

1

This invention relates to control systems for regulating the direction of flow of hydraulic fluid to a hydraulic motor in response to movement imparted to the hydraulic motor when fluid is directed thereto by causing initial mechanical energy to be translated into hydraulic energy for regulating the control mechanism of the control system.

An object of the invention is to provide a mechanically actuated control unit that is constructed and arranged to translate mechanical energy into a hydraulic force for actuating a fluid flow control mechanism whereby to regulate the direction of flow of fluid through the fluid control mechanism and control the rate of flow of fluid through the fluid control mechanism when passing fluid therethrough in at least one direction.

Another object of the invention is to provide a control mechanism in accordance with the foregoing object wherein the fluid is directed to a hydraulic motor for operating the same and the hydraulic motor mechanically actuates the mechanism for translating the mechanical energy into hydraulic force whereby to control the flow control mechanism in response to the operation of the hydraulic motor.

It is still another object of the invention to provide a control mechanism and system therefor wherein the control mechanism is adapted to regulate the fluid flow control mechanism to cause the same to reduce the volume of fluid delivered to a hydraulic motor substantially in accordance with the movement of the piston of the hydraulic motor whereby to create a slow-down operation of the motor and to also store up mechanical energy that is translated into hydraulic power for rapidly moving the fluid flow control mechanism to produce reversal of flow of fluid through the fluid flow control mechanism.

Another object of the invention is to provide a control system in accordance with any of the foregoing objects wherein the source of hydraulic fluid under pressure for operating the hydraulic motor is a reversible variable delivery pump.

Another object of the invention is to provide a control system in accordance with any of the foregoing objects wherein the source of hydraulic fluid under pressure for operating the hydraulic motor is a constant delivery pump having a flow control reversing valve associated therewith.

Further objects and advantages will become apparent from the drawings and the following description.

2

Figure 1:
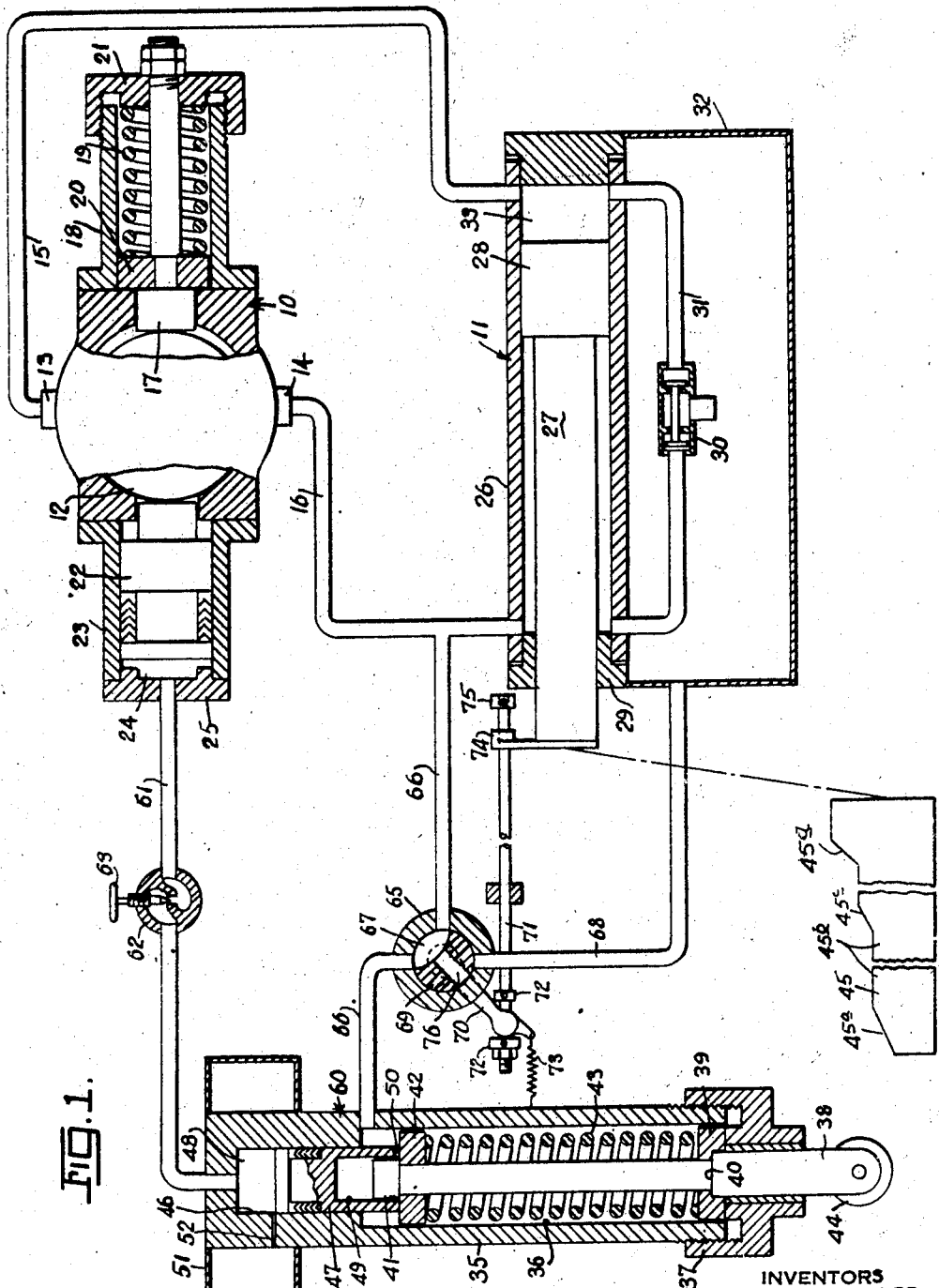
Figure 1 is a schematic view of a hydraulic system for operating a hydraulic motor including the control mechanism of this invention as applied to a reversible variable delivery pump.

As illustrated in Figure 1 the control mechanism is associated with a reversible variable delivery pump 10 that delivers fluid under pressure to a double-acting hydraulic motor 11 for operating the same. The reversible variable delivery pump 10 may be of any of the conventional forms of such pumps wherein there is provided a plurality of radially disposed piston-cylinder assemblies that rotate about a common axis and are adapted to be shifted eccentrically relative to the driving axis of the pump whereby to discharge fluid under pressure from the pump. The piston-cylinder assemblies are usually carried within a shift ring 12 whereby to shift the eccentricity between the axis of the piston-cylinder assemblies and the drive axis of the pump so that the pump will deliver fluid through its service connections in either direction or may stand on neutral with no delivery of pressure fluid in either direction. Such reversible variable delivery pumps are well-known in the art and it is not deemed necessary to describe the same further. The reversible variable delivery pump 10 is provided with the service connections 13 and 14 to which conduits 15 and 16 are connected. The conduits 15 and 16 are connected to opposite ends of the hydraulic motor 11 for delivering fluid under pressure to either end of the hydraulic motor 11 in accordance with the position of the shift ring 12 of the pump 10 on one side of the driving center of the pump or the other to cause discharge of fluid under pressure to either conduit 15 or 16, accordingly.

The shift ring 12 of the pump 10 is engaged by a shift rod 17 that enters a spring cage 18 having a compression spring 19 therein positioned between a collar 20 carried on the shift rod 17 and an end cap 21 closing the end of the spring cage 18. The spring 19 continuously urges the shift ring 12 in a leftward direction whereby to cause delivery of fluid under pressure through the conduit 15.

The spring 19 is opposed by means of a piston 22 that is reciprocable in the cylinder 23, the piston 22 engaging the shift ring 12 to cause the same to move in a rightward direction against the spring 19 when a fluid under pressure is admitted into the chamber 24 provided between the head of the piston and the end wall 25 of the cylinder 23.

The hydraulic motor 11 consists of a cylinder 26 having a plunger 27 therein that carries the piston 28. The plunger 27 extends through the end wall 29 of the cylinder 26 to perform any desired work operation.

A make-up valve 30 is connected in the conduit 31 that connects between opposite ends of the cylinder 26 for supplying fluid from the reservoir 32 to the pump 10 whereby to provide means for supplying additional fluid into the chamber 33 of the cylinder 26 when the pump is delivering into the chamber 33. The makeup valve 30 is of the conventional shuttle valve construction well-known in the art and used for this purpose.

The control for the reversible variable delivery pump 10 to change the direction of delivery from the pump and to regulate the rate of discharge includes a cylinder body 35 having a longitudinal bore 36 therein that is closed on one end by a closure cap 37 threaded upon the body 35. A plunger rod 38 extends through the closure cap 37 and has a collar 39 carried thereon against a shoulder 40 on the rod 38. The opposite end of the rod 38 has a head 41 engaged by a collar 42. A compression spring 43 extends between the collars 39 and 42 to normally retain these collars against the shoulder 40 and the head 41, respectively. The assembly just referred to is reciprocable in the cylinder bore 36 for purposes to be hereinafter described.

The projecting end of the rod 38 has a roller 44 carried thereon that engages a cam bar 45 that is actuated by the plunger 27 of the hydraulic motor 11. The cam bar 45 may be carried directly by the plunger 27 or be actuated thereby through a suitable linkage system so that reciprocal movement of the cam bar 45 represents similar reciprocal movement of the plunger 27 of the hydraulic motor 11.

The cylinder body 35 has a second longitudinal bore 46 extending coaxially from the bore 36 in which a piston 47 reciprocates. The piston 47 has the lower end thereof resting upon the collar 42 carried by the plunger rod 38 while the upper end of the piston 47 forms one wall of a chamber 48 in the cylinder bore 46. The piston 47 has a counterbore 49 that is connected with the bore 36 through a passage 50 provided in the wall of the cylinder 47 to permit entry of fluid under pressure for operating the piston in a manner that will be hereinafter described. A reservoir 51 is positioned around the end of the cylinder body 35 and is connected with the chamber 48 by means of a conduit passage 52. This passage 52 is so positioned that it is in open communication between the chamber 48 and the reservoir 51 only when the piston 47 is in its completely downward position as illustrated in Figure 1. The reservoir 51 is provided with a body of fluid for maintaining the chamber 48 filled under the conditions of operation.

The chamber 48 of the control member 60 is connected to the chamber 24 of the pump control cylinder 23 by means of a conduit 61 that has an adjustable choke valve 62 positioned therein. The choke valve 62 may be manually adjusted to vary the opening of the passage through the valve by means of the control handle 63. The choke valve 62 is adapted to be adjusted so as to restrict the flow of fluid from the chamber 48 in the control member 60 to the chamber 24 in the pump control cylinder 23 in a manner to be hereinafter described. These connections 48, 62, 61 and 24 constitute a regulated force transmitting means. A three-way valve 65 is placed in a conduit 66 that connects the cylinder bore 36 of the control member 60 with the service conduit 16 for the pump 10, so that when the valve passage 67 is in the position illustrated in Figure 1 the cylinder bore 36 of the control member 60 is opened to exhaust by way of the make-up valve 30 or to the suction side of the pump 10 by way of conduit 16, the conduit 15 at this time being the discharge conduit from the pump 10 for reasons which will become more apparent hereinafter. A second conduit 68 connects the valve passage 67 with the reservoir 32 through a passage 76 when the rotor 69 of the valve 65 has been rotated to the position wherein the passage 76 is in alignment with the conduit 68 to connect the conduit 66 with the reservoir 32 for reasons hereinafter described.

The valve 65 is operated by means of a lever 70 that extends from the rotor 69 into engagement with a rod 71, suitable collars 72 being provided on opposite sides of the arm 70 for oscillating the same upon reciprocation of the rod 71. A tension spring 73 normally urges the lever in the leftward direction, as illustrated in Figure 1, so that the valve passage 67 will be normally pulled into this position.

The rod 71 extends through an arm 74 that projects from the plunger 27 of the hydraulic motor 11. The rod 71 has a collar 75 thereon that is engaged by the arm 74 near the end of the retraction stroke, or rightward stroke, of the plunger 27 so as to shift the rotor 69 of the valve 65 to align the passage 76 with the conduit 68 and thereby exhaust the chamber bore 36 of the control member 60.

When the hydraulic motor 11 is on forward stroke, that is moving to the left, the pump 10 is delivering fluid under pressure into the conduit 15 and is withdrawing fluid from the hydraulic motor 11 through the conduit 16, additional fluid required for filling the chamber 33 of the hydraulic motor being drawn in through the make-up valve 30. The valve 65 and the control member 60 are in the position as illustrated in Figure 1 when the hydraulic motor is thus on its forward stroke. The pump 10 will be delivering full capacity into the conduit 15, thus the shift ring 12 will have moved the pumping mechanism to the left so as to cause the same to deliver the full capacity, the spring 19 having caused this operation.

When the plunger 27, to which the cam bar 45 may be attached moves forward, the cam surface 45a on the cam bar 45 will strike the roller 44 on the plunger 38 of the control member 60 and cause the plunger 38 to move upwardly into the cylinder bore 36 until the roller 44 reaches the flat surface 45b on the cam bar 45.

As soon as the plunger 38 begins its upward movement the passage 52 between the chamber 48 and the reservoir 51 will be closed by the head of the piston 47 thus trapping liquid in the chamber 48, the conduit 61 and the chamber 24 of the control cylinder 23. The liquid trapped in the chamber 48 will thus be transferred from the chamber 48 to the chamber 24 of the control cylinder 23 causing the piston 22 to be moved a rightward direction and thus shifting the shift ring 12 of the pump 10 toward neutral, or no-delivery position. The liquid in the chamber 48 and the conduit 61 thus provides a hydraulic force for moving the piston 22 and shifting the pump 10.

The choke valve 62 is preferably adjusted so that the rate of flow through the choke valve is the same as the rate at which liquid is discharged from the chamber 48 by the upward movement of the piston 47 whereby the control piston 22 for the pump 10 is caused to substantially follow the actuating movement of the cam bar 45 and thus follow the movement of the plunger 27 of the hydraulic motor 11. By this arrangement the pump is caused to deliver less fluid under pressure into the conduit 15 whereby the plunger 27 of the hydraulic motor 11 is placed on a forward slow-down stroke. The point of maximum slow-down, or position of the plunger 27 in its forward movement at the position of maximum slow-down can be calculated by the position of the juncture between the cam rise surface 45a and the cam land 45b. If desired a second cam surface 45c can be provided on the cam bar 45 to produce an additional slow-down action upon the hydraulic motor 11 by shifting the pump 10 further toward neutral position.

If the liquid is discharged from the chamber 48 of the control member 60 at the same rate that it is received into the chamber 24 of the control cylinder 23, it will be quite apparent that when the pump 10 reaches neutral position there will be no further delivery of pressure fluid through the conduit 15 thus stopping the plunger 27 of the hydraulic motor 11 and the pump 10 would never go into reverse delivery position.

To overcome this condition the cam rise 45d is provided on the cam bar 45 that is substantially steeper than the cam rise 45a. When the cam rise 45d strikes the roller 44 the plunger 38 is moved upwardly at a more rapid rate than liquid can be displaced from the chamber 48 of the control member 60 through the choke valve 62, whereby the head 41 of the plunger 38 will move upwardly into the recess 49 in the piston 47 and the spring 43 will thereby be compressed to provide a storing of mechanical energy in the spring for continuing movement of the piston 47 even though the plunger 38 is stationary. It will be apparent that if the head of the plunger 41 is removed from contact with the collar 42 that the compression of the spring 43 will move the piston 47 into the chamber 48 and thereby displace liquid from the chamber 48 through the choke valve 62 into the chamber 24 of the control cylinder 23 until such time as the collar 42 again engages the head 41 on the end of the plunger rod 38. The piston 22 will thereby be moved toward the right to shift the pump 10 through the neutral position and into the reverse delivery position so that fluid under pressure will then be discharged through the conduit 16 into the push-back side of the hydraulic motor 11.

When the pump 10 begins delivery of fluid under pressure into the conduit 16 the piston 28 of the hydraulic motor 11 will be moved in a rightward direction, carrying with it the cam bar 45. The plunger 38 will thus follow the cam bar 45 and move outwardly away from the piston 47. However, when pressure fluid was supplied to the conduit 16, pressure fluid also passed through the conduit 66 into the chamber 36 and entered the chamber 49 in the piston 47 to thereby hold the piston 47 in its upwardly disposed position to retain the pump 10 on the reverse delivery position.

The plunger 27 of the hydraulic motor 11 can now move in a rightward direction, on its return stroke, the valve 65 remaining in its position as illustrated in Figure 1. When the plunger 27 approaches the end of its return stroke the arm 74, attached to the plunger 27, will strike the collar 75 carried on the rod 71 and move the rod 71 in a rightward direction to rotate the valve 65 in a counterclockwise direction and thereby bring the passages 76 into communication with the conduit 68 whereupon pressure is released from the conduit 66 and the chamber 36, in the control member 60. This release of pressure upon the piston 47 in the control member 60 permits the spring 19 of the pump 10 to move the shift ring 12 in a leftward direction and thereby displace liquid from the chamber 24 in the control cylinder 23 into the chamber 48 of the control member 60, thereby placing the pump 10 on forward delivery position so that fluid under pressure will again be discharged into the conduit 15. As soon as the plunger 27 of the hydraulic motor 11 has advanced a part of its stroke, the valve 65 will be rotated in a clockwise direction by means of the spring 73 to again place it in the position, as illustrated in Figure 1, for action to accomplish another return stroke as heretofore described.

From the foregoing description it will now become apparent that by this invention mechanical power is used for hydraulically shifting a pump from one delivery position toward another and mechanical energy is stored for shifting the pump through a neutral position from one delivery position to another.

Figure 2:
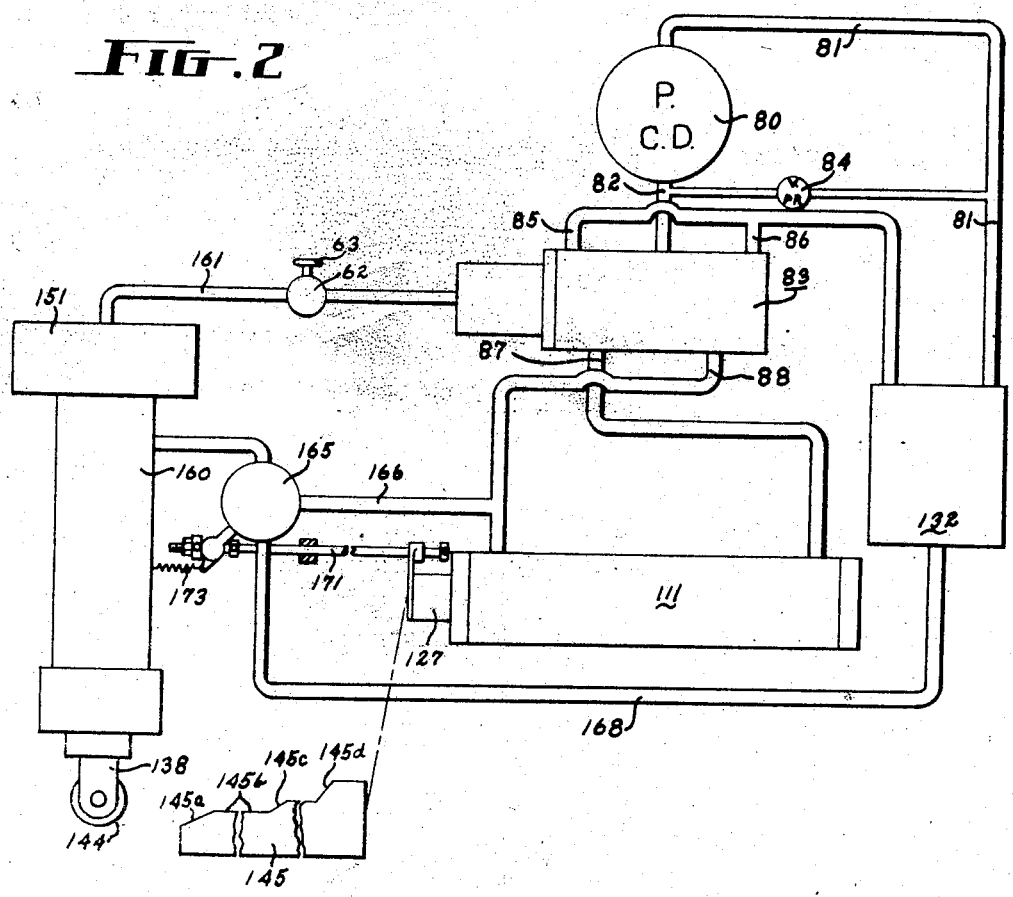
Figure 2 is a schematic view of a hydraulic system for operating a hydraulic motor including the control mechanism of this invention as applied to a constant delivery pump.

While the invention heretofore described has been in combination with a reversible variable delivery pump, the invention is applicable for use with a unidirectional delivery pump that has valve means associated therewith for shifting the direction of flow of fluid from the pump to opposite ends of a hydraulic motor. In Figure 2 there is illustrated such a system having the valve element illustrated in Figure 3 and in referring to the system, illustrated in Figure 2, the same numerals will be used as referred to in Figure 1 for identical elements except that the numerals are raised by 100.

In this arrangement there is provided a unidirectional delivery pump 80 having an inlet conduit 81 connected to the reservoir 132 and a pressure discharge conduit 82 that delivers into the reversing valve 83. A pressure relief valve 84 connects the pressure delivery side 82 with the inlet side 81 to prevent an abnormal rise in the pressure delivered from the pump.

The reversing valve 83 is provided with exhaust lines 85 and 86 on opposite ends thereof that communicate with the reservoir 132. The reversing valve is also provided with two service lines 87 and 88 that are connected to opposite ends of the hydraulic motor 111, the service line 88 being connected to the valve 165 through the conduit 166.

Figure 3:
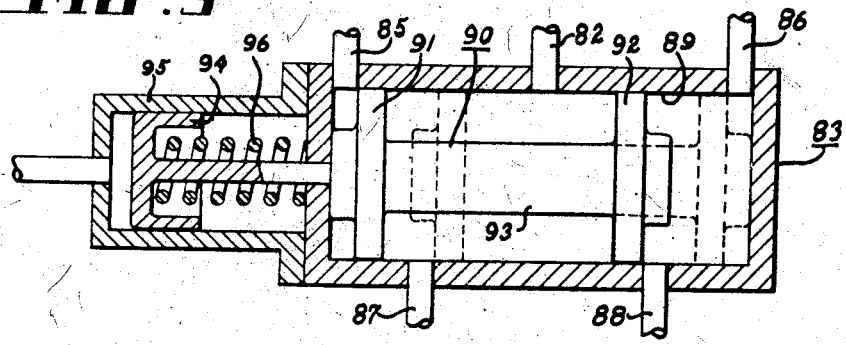
Figure 3 is a longitudinal cross sectional view of a flow control reversing valve associated with the constant delivery pump.

As illustrated in Figure 3 the reversing valve 83 is provided with a cylinder bore 89 that carries a valve member 90 having the spools 91 and 92 thereon. The valve rod 93 extends through the end of the casing of the reversing valve 83 and carries a piston 94 reciprocable in the cylinder 95. A compression spring 96 continuously urges the piston 94 in a leftward direction to normally position the valve spools 91 and 92 as illustrated in full lines in the drawing in Figure 3.

The operation of the reversing valve 83 will now be apparent wherein delivery through the conduit 82, when the valve is positioned as illustrated in Figure 3, will cause delivery into the service line 87 and thus place the hydraulic motor 111 on a forward or advancing stroke. The operation of the control member through the cam bar 145 will be the same as heretofore described except that instead of shifting the pump 10 toward neutral the piston 94 of the reversing valve 83 will move in a rightward direction to cause the spool 92 to gradually close the discharge service line 88 and thereby slow down the rightward movement of the plunger 127 of the hydraulic motor 111. As soon as the rapid rise cam surface 145d engages the roller 144 the control member 160 will actuate the piston 94 of the reversing valve 83 to shift the valve through the position wherein both service ports 87 and 88 are closed by the spools 91 and 92 into the position illustrated in dotted lines so that the pump 80 will now deliver from the discharge conduit 82 into the service line 88.

As soon as pressure is applied to the service line 88, pressure is also applied to the conduit 166 and thereby holds the piston of the control member 60 in position to retain the reversing valve 83 in the dotted line position until the pressure is relieved in the service line 88 and the conduit 166 by operation of the valve 165 in the manner heretofore described.

It will therefore be apparent that the system disclosed in Figure 2 will function in identically the same manner as the system disclosed in Figure 1.

While the invention disclosed and described herein is illustrated by a preferred form of the invention, yet it is to be understood that the apparatus disclosed is capable of mechanical modification, or alteration without departing from the spirit of the invention, and that such modifications as fall within the scope of the appended claims are intended to be included herein.

Having thus fully described our invention what we claim as new and desire to secure by Letters Patent is:

1. A fluid flow controlling apparatus in a hydraulic actuating system that includes, means providing a source of fluid under pressure for actuating a fluid motor operably connected therewith and including means reversing the direction of flow of fluid under pressure between the source and the fluid motor having two definite positions for causing delivery of pressure fluid from said source in either of two directions and which passes through a neutral or non-delivery position when shifting the flow of fluid from one direction to the other, mechanically actuated means operably connected with said fluid motor for actuation thereby including means for mechanically storing energy upon actuation of said mechanical means, means for producing hydraulic pressure operably connected to said mechanical means and hydraulically connected with said fluid flow reversing means for hydraulically operating the same to shift said flow reversing means from one of said positions to the other through the neutral position upon release of energy mechanically stored in said mechanical means, and means hydraulically connecting said means for producing hydraulic pressure with said source of fluid pressure on the discharge side thereof after the fluid flow therethrough has been reversed upon actuation of said reversing means by said mechanical means whereby to retain said means for producing hydraulic pressure in operative position to retain said source of fluid pressure on delivery in the direction of flow as caused by operation of said mechanical means.

2. A fluid flow controlling apparatus in a hydraulic actuating system that includes, means providing a source of fluid under pressure for actuating a fluid motor operably connected therewith and including means reversing the direction of flow of fluid under pressure between the source and the fluid motor having two definite positions for causing delivery of pressure fluid from said source in either of two directions and which passes through a neutral or non-delivery position when shifting the flow of fluid from one direction to the other, mechanically actuated means operably connected with said fluid motor for actuation thereby including means for mechanically storing energy upon actuation of said mechanical means, means for producing hydraulic pressure operably connected to said mechanical means and hydraulically connected with said fluid flow reversing means for hydraulically operating the same to shift said flow reversing means from one of said positions to the other through the neutral position upon release of energy mechanically stored in said mechanical means, means hydraulically connecting said means for producing hydraulic pressure with said source of fluid pressure on the discharge side thereof after the fluid flow therethrough has been reversed upon actuation of said reversing means by said mechanical means whereby to retain said means for producing hydraulic pressure in operative position to retain said source of fluid pressure on delivery in the direction of flow as caused by operation of said mechanical means, and means operably connected to said fluid motor for releasing pressure from said last mentioned hydraulic connection in response to a predetermined position of said fluid motor whereby to permit said fluid flow reversing means to reverse delivery from said fluid source and thereby direct fluid under pressure in the opposite direction to said fluid motor.

3. A fluid flow controlling apparatus in a hydraulic actuating system that includes, means providing a source of fluid under pressure for actuating a fluid motor operably connected therewith and including means reversing the direction of flow of fluid under pressure between the source and the fluid motor having means for normally positioning said flow reversing means in one of two positions to normally cause said source to deliver in one direction and hydraulically actuated means opposing the same to shift the flow reversing means through a neutral or non-delivery position into a second position for reversing the flow of fluid from said source, mechanically actuated means operably connected to said fluid motor for actuation thereby having means to directly transmit motion of said fluid motor and resilient means for mechanically storing energy upon motion thereof by said fluid motor, means for hydraulically producing pressure operably connected to said mechanical means for actuation thereby and hydraulically connected to said hydraulic actuating means of said flow reversing means, and fluid throttle control means in said last mentioned hydraulic connection to regulate the rate of transfer of fluid from said means for producing hydraulic pressure to said hydraulic actuating means of said flow reversing means whereby actuation of said mechanical means by said fluid motor at a rate greater than that at which fluid can be displaced from the means producing hydraulic pressure through said throttle control means causes said resilient means to store energy mechanically to continue transfer of fluid from said means producing hydraulic pressure to said hydraulic actuating means for said flow reversing means and shift the same through neutral position to reverse flow position after the actuation of said mechanical means has stopped and energy is released by said resilient means.

4. A fluid flow controlling apparatus in a hydraulic actuating system that includes, means providing a source of fluid under pressure for actuating a fluid motor operably connected therewith and including means reversing the direction of flow of fluid under pressure between the source and the fluid motor having means for normally positioning said flow reversing means in one of two positions to normally cause said source to deliver in one direction and hydraulically actuated means opposing the same to shift the flow reversing means through a neutral or non-delivery position into a second position for reversing the flow of fluid from said source, mechanically actuated means operably connected to said fluid motor for actuation thereby having means to directly transmit motion of said fluid motor and resilient means for mechanically storing energy upon motion thereof by said fluid motor, means for hydraulically producing pressure operably connected to said mechanical means for actuation thereby and hydraulically connected to said hydraulic actuating means of said flow reversing means, fluid throttle control means in said last mentioned hydraulic connection to regulate the rate of transfer of fluid from said means for producing hydraulic pressure to said hydraulic actuating means of said flow reversing means whereby actuation of said mechanical means by said fluid motor at a rate greater than that by which fluid can be displaced from the means producing hydraulic pressure through said throttle control means as actuated thereby causes said resilient means to store energy mechanically to continue transfer of fluid from said means producing hydraulic pressure to said hydraulic actuating means for said flow reversing means and shift the same through neutral position to reverse flow position after actuation of said mechanical means has stopped and energy is released by said resilient means, and means hydraulically connecting said means for producing hydraulic pressure with the discharge side of said source after shifting thereof by said mechanical means whereby to retain said means for producing hydraulic pressure in position to retain said flow reversing means in position to maintain the flow of fluid from said source in said reversed direction.

5. A fluid flow controlling apparatus in a hydraulic actuating system that includes, means providing a source of fluid under pressure for actuating a fluid motor operably connected therewith and including means reversing the direction of flow of fluid under pressure between the source and the fluid motor having means for normally positioning said flow reversing means in one of two positions to normally cause said source to deliver in one direction and hydraulically actuated means opposing the same to shift the flow reversing means through a neutral or non-delivery position into a second position for reversing the flow of fluid from said source, mechanically actuated means operably connected to said fluid motor for actuation thereby having means to directly transmit motion of said fluid motor and resilient means for mechanically storing energy upon motion thereof by said fluid motor, means for hydraulically producing pressure operably connected to said mechanical means for actuation thereby and hydraulically connected to said hydraulic actuating means of said flow reversing means, fluid throttle control means in said last mentioned hydraulic connection to regulate the rate of transfer of fluid from said means for producing hydraulic pressure to said hydraulic actuating means of said flow reversing means whereby actuation of said mechanical means by said fluid motor at a rate greater than that by which fluid can be displaced from the means producing hydraulic pressure through said throttle control means causes said resilient means to store energy mechanically to continue transfer of fluid from said means producing hydraulic pressure to said hydraulic actuating means for said flow reversing means and shift the same through neutral position to reverse flow position after actuation of said mechanical means has stopped and energy is released by said resilient means, means hydraulically connecting said means for producing hydraulic pressure with the discharge side of said source after shifting thereof by said mechanical means whereby to retain said means for producing hydraulic pressure in position to retain said flow reversing means in position to maintain the flow of fluid from said source in said reversed direction, and means operably connected to said fluid motor and actuated thereby for releasing pressure from said last mentioned hydraulic connection upon a predetermined stroke of said fluid motor whereby to permit said flow reversing means to shift delivery from said source to said first mentioned normal direction of delivery therefrom.

6. In a fluid flow controlling apparatus, a source of fluid pressure, a reversible motor, hydraulic connections between said source and said motor including control means movable from a first position causing operation of said motor in one direction, through neutral, to a second position causing operation of said motor in the opposite direction, yielding means urging said control means into said first position, pressure responsive means operable to move said control means into said second position, fluid pressure generating means movable between first and second positions and hydraulically connected to operate said pressure responsive means, means mechanically operated by said motor in one position, including energy storing means for urging said generating means from first to second positions causing movement of said control means into said second position, pressure connections from said control means, operable to maintain said generating means in its said second position, and means operated by said motor in a second position to vent said pressure connections whereby said yielding means effects a reversal of fluid flow to said motor.

7. In a fluid flow controlling apparatus, a source of fluid pressure, a reversible motor, hydraulic connections between said source and said motor including control means movable from a first position causing operation of said motor in one direction, through neutral, to a second position causing operation of said motor in a reverse direction, yielding means urging said control means into said first position, force transmitting means operable from a first to a second position to move said control means into said second position, means operated by said motor in one position, including energy storing means for urging said transmitting means into said second position, a pressure connection from said source operable to maintain said force transmitting means in said second position, and means operated by said motor in a second position to vent said connection and permit said yielding means to return said control means to first position.

JOHAN A. MULLER.
WARREN R. TUCKER.

REFERENCES CITED

The following references are of record in the file of this patent:

UNITED STATES PATENTS

| Number | Name | Date |
| --- | --- | --- |
| 153,784 | Rickert | Aug. 4, 1874 |
| 260,398 | Jenkins | July 4, 1882 |
| 717,136 | Thomas | Dec. 30, 1902 |
| 2,110,593 | Ernst | Mar. 8, 1938 |
| 2,139,101 | Spencer | Dec. 6, 1938 |
| 2,192,778 | Stacy | Mar. 5, 1940 |
| 2,363,760 | Waldie | Nov. 28, 1944 |
| 2,366,388 | Crosby | Jan. 2, 1945 |
| 2,391,996 | Muller | Jan. 1, 1946 |

FOREIGN PATENTS

| Number | Country | Date |
| --- | --- | --- |
| 14,135 | Great Britain | 1884 |

OTHER REFERENCES

Ser. No. 400,816, Lang (A. P. C.), published Apr. 20, 1943.